United States Patent [19]

Edwards

[11] Patent Number: 5,004,332
[45] Date of Patent: Apr. 2, 1991

[54] TELEMICROSCOPE WITH AT LEAST ONE LIGHT ABSORBING ANNULAR BAFFLE FITTING

[75] Inventor: D. Brandon Edwards, Virginia Beach, Va.

[73] Assignee: Edwards Optical Corporation, Virginia Beach, Va.

[21] Appl. No.: 343,030

[22] Filed: Apr. 25, 1989

[51] Int. Cl.⁵ .................. G02B 21/20; G02B 23/18; G02B 7/04; G02B 9/10
[52] U.S. Cl. .................. 350/453; 350/507; 350/537; 350/146; 350/276 SL; 350/448
[58] Field of Search .............. 350/507, 537, 547, 501, 350/276 R, 276 SL, 146, 319, 448, 449, 453; 351/158

[56] References Cited

U.S. PATENT DOCUMENTS

| | | | |
|---|---|---|---|
| 3,153,690 | 10/1964 | Kuyt et al. | 350/563 |
| 3,465,149 | 9/1969 | Flint | 250/83.3 |
| 3,488,103 | 1/1970 | Davis | 350/276 SL |
| 3,699,471 | 10/1972 | Mulready et al. | 350/276 SL |
| 4,150,191 | 4/1979 | Karki | 350/276 SL |
| 4,540,238 | 9/1985 | Edwards | 350/146 |
| 4,542,963 | 9/1985 | Linlor | 350/276 R |
| 4,598,981 | 1/1986 | Hallam et al. | 350/276 R |
| 4,831,258 | 5/1989 | Paulk et al. | 250/349 |

FOREIGN PATENT DOCUMENTS 155976 1/1963 U.S.S.R. .................. 374/121

OTHER PUBLICATIONS

C. Leinert et al., "Stray Light Suppression...", *Applied Optics*, vol. 13, No. 3, Mar. 1974, pp. 556–562.

Smith, *Modern Optical Engineering*, New York: McGraw Hill, 1966, pp. 128–131.

Primary Examiner—Jon W. Henry
Attorney, Agent, or Firm—Hamilton, Brook, Smith & Reynolds

[57] ABSTRACT

A telemicroscope has a light absorbing and blocking annular baffle within the telemicroscope barrel. The baffle is positioned between the front and rear lenses and reduces glare in the telemicroscope by blocking and absorbing light which would ordinarily reflect off the inner surfaces of the telemicroscope barrel. The baffle has a knife-edge inner diameter and its surfaces are given a dull finish to enhance its light absorbing properties.

20 Claims, 1 Drawing Sheet

TELEMICROSCOPE WITH AT LEAST ONE LIGHT ABSORBING ANNULAR BAFFLE FITTING

BACKGROUND OF THE INVENTION

This invention relates to improvements in a telemicroscope such as that in the telemicroscopic apparatus previously disclosed and claimed in U.S. Pat. No. 4,540,238 to D. Brandon Edwards, and that described in pending U.S. patent application Ser. No. 07/134,794 to D. Brandon Edwards et al. The term "telemicroscope" applies to both telescopes and microscopes. In a preferred implementation of the telemicroscopic apparatus disclosed in U.S. Pat. No. 4,540,238, a miniature telescope was mounted in a spectacle lens. With a sufficiently small telescope mounted at about the optic axis of the lens, one can obtain bilevel viewing in which a principle image and a small magnified image can be viewed without confusion.

In a preferred implementation of the telemicroscopic apparatus disclosed in U.S. patent application Ser. No. 07/134,794, the telemicroscopic apparatus is placed at an angle relative to the optic axis of a spectacle lens. This allows a principle image and a clear magnified image of the same object to be viewed simultaneously.

One of the problems confronting many telemicroscopes is that of glare reaching the viewer's eye due to reflection of light off the inner surfaces of the telemicroscope barrel. This is a particular problem with miniature telescopes where the inside walls are very close to the central viewing axis of the scope barrel. One attempt at relieving this problem involves covering the inner surfaces of the barrel with small fibers which absorb much of the light reaching those surfaces. This approach is presented in the above-mentioned patent application Ser. No. 07/134,794.

SUMMARY OF THE INVENTION

Although small fibers represent an effective way to control the glare, it is not the most efficient. In addition to any light that manages to pass through the fibers, additional glare is created by the reflection of light off the tips of the fibers themselves.

In accordance with this invention, a telemicroscope has a tubular barrel, and a front lens and rear lens fitting within the circumference of the barrel. The barrel of the telemicroscope may be formed of at least two portions coupled by screw threads. The two portions are adapted to be rotated relative to each other for focussing of the telemicroscope. A light absorbing annular baffle fits within the circumference of the barrel positioned between the front lens and the rear lens. The baffle has an outer diameter approximately equal to the inner diameter of the barrel which is preferably less than 16.0 millimeters. The inner surface of the baffle is tapered to an edge, and the baffle is given a dull finish to enhance its light absorbing properties. The inner diameter edge of the baffle is sharpened to a knife edge to reduce light reflection off that edge. In one variation, the baffle of the telemicroscope may be placed next to a lens to prevent light from passing through a portion of the lens surface.

The telemicroscope may be used in a telemicroscopic apparatus in which the telemicroscope is mounted to a carrier for positioning in front of a person's eye. Such a telemicroscopic apparatus is often a pair of spectacles in which the telemicroscope is mounted in a spectacle lens. By mounting the telemicroscope such that its central axis is tilted relative to the proper central line of sight through the carrier, a viewer is able to view and perceive a principal image of an object and a clear magnified image of the object simultaneously.

DETAILED DESCRIPTION OF A PREFERRED EMBODIMENT

Figure 1:
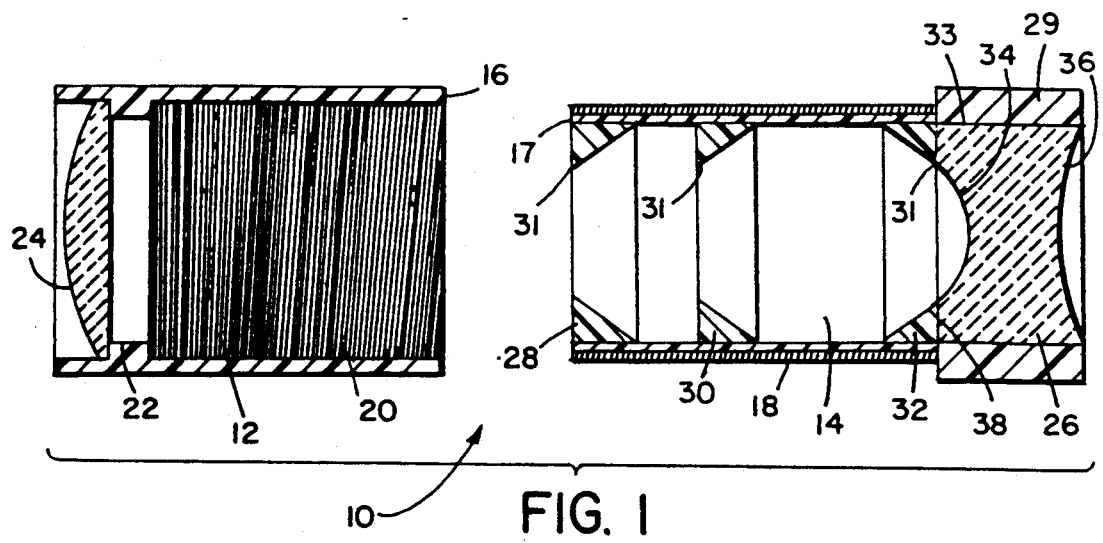
FIG. 1 is a cross-section of a telemicroscope having light absorbing baffles.

Shown in FIG. 1 is a cross section of a telemicroscope generally indicated 10. The telemicroscope 10 is in two connectable portions, a front tube 12 and a rear tube 14. A hard plastic casing 16, 17 forms the body of both telemicroscope tubes 12,14. The casing 17 on the rear tube is partially surrounded by screw threads 18. Rear tube 14 is smaller in diameter than front tube 12, and the inner surface of the front tube 12 has screw threads 20 which mesh with the screw threads of the rear tube. The two tubes are connected and aligned by screwing rear tube 14 into front tube 12. This also provides a means by which to adjust the length of the telemicroscope 10.

Toward the front of front tube 12 is annular lip 22 formed on the plastic casing 16. Fitting tightly within the casing 16 and positioned against the front side of this lip 22 is positive lens 24. This lens works in conjunction with a negative lens 26 located toward the rear of rear tube 14. The outer circumference of the negative lens 33 is painted black to absorb light and thus minimize reflection from the sides of the lens. The plastic casing 17 of the rear tube has a thick portion 29 adjacent to the screw threads 16. The outer diameter of the thick portion 29 is roughly equal to the outer diameter of the casing 16 of the front tube 12.

Within the body of rear tube 14 are several annular baffles 28,30,32 which block and absorb light which reaches them. The side walls of the tube are very close to the central viewing axis of the telemicroscope 10. Because of this, any light reflected from the side walls of the tube interferes with the view through the scope. In this system, reflected light is blocked and absorbed by the baffles 28,30,32 to prevent it from reaching the viewer's eye. The baffles are highly light absorbent, but are also angled in such a way that any light which is not initially absorbed by the baffle surfaces is trapped by the baffles to eventually be absorbed by them. By absorbing the light striking the side walls of the tube, the glare at the viewing port of the telemicroscope is reduced.

The outer diameter of each baffle 28,30,32 is such that the outer surface of each baffle is flush against the inner surface of tube 14. This prevents any light from leaking around the circumference of the baffles. The inner surface diameter of each baffle varies uniformly over the axial thickness of the baffle, intersecting the outer diameter at one side and decreasing linearly toward the other side. The inner surface of each baffle is thus a conic section. This varying inner diameter results in an edge at the intersection with a radial surface at the inner diameter. The conic surfaces of baffles 28 and 30 face rearwardly toward the negative lens 26.

As light enters positive lens 24, some of the light stays within the central region of the telemicroscope, and some is directed toward the inner surfaces of the tubes. The light travelling directly through the tubes is undistorted and leaves the telemicroscope as part of a useful magnified image. Any light reflected off the side walls of the tubes, however, is distorted by a path change and becomes optical noise which appears to a viewer as annoying glare. In the present embodiment, the baffles 28,30,32 are positioned to block and absorb the light which does not stay within the central viewing aperture of the telemicroscope. Prior to insertion in the tube casing 16, the baffles 28,30,32 are placed in a tumbler with grit in order to dull the surface finish. The result is a dull gray finish which is highly light absorbent. The inner surface of casing 16 also has a light absorbent finish. Thus when light enters the telemicroscope, the portion of it diverging toward the sides of the tubes is absorbed and/or deflected away from the central viewing axis by the baffles 28,30,32.

The smallest inner radius of the baffles defines the aperture through which light propagates in the telemicroscope. A circular edge 31 is formed where the inner surface and the flat side surface of each baffle meet. During fabrication of the baffle, the circular edges 31 are machined to be sharp knife edges. If the edges are dull, light reflects off the edges and produces a certain amount of glare. By having the edges 31 as sharp as possible, this glare is reduced. It is therefore best that these edges be machined and not molded, as molding does not produce a sharp enough knife edge.

In the present embodiment, negative lens 26 has an internal surface 34 with a high degree of curvature, as may often be the case in a telemicroscope. The outer surface 36 has a much lower degree of curvature than the inner surface. The lens 26 extends to the inner surface of the tube 14. Because the inner curvature of the lens does not allow a useful diameter which matches the inner diameter of the tube, a flat annular region 38 of the lens 26 extends from the curved lens surface 34 to the inner surface of the tube. Since the flat surface 38 is not a lens consistent with system parameters, light must be prevented from entering the lens 26 at the flat surface 38 to prevent unwanted optical noise from reaching the viewers eye.

Baffle 32 faces the opposite way of the other baffles in the system, and is used to prevent light from entering the negative lens 26 through the flat surface 38. The flat annular side of the baffle 32 is positioned next to the flat annular surface 38 of lens 26. The baffle is sized so that its annular surface is sufficient to block any light from reaching the flat surface 38 of lens 26.

The rear-most baffle serves as a field stop to control the field of view and the front baffle is an aperture stop which controls the brightness of the system. It is preferred that these baffles be close to the respective negative and positive lenses.

The baffles for the present embodiment are sized to fit the particular telemicroscope in question. A typical outside diameter for a telemicroscope, measured on the front tube 16, is 6.4 mm. Baffles used successfully in a 6.4 mm telemicroscope have had an outer diameter of 4.8 mm and an inner diameter of 3.6 mm. Another typical outside diameter for a telemicroscope is 15.9 mm. Baffles used successfully on a 15.9 mm telemicroscope have had an outer diameter of 12.7 mm and an inner diameter of 11.1 mm. In general, it has been determined that the baffle becomes much less efficient when the difference between the outer diameter and the inner diameter of the baffle is less than about 1.0 mm. Also the difference should generally be no greater than 4.0 mm.

Figure 2:
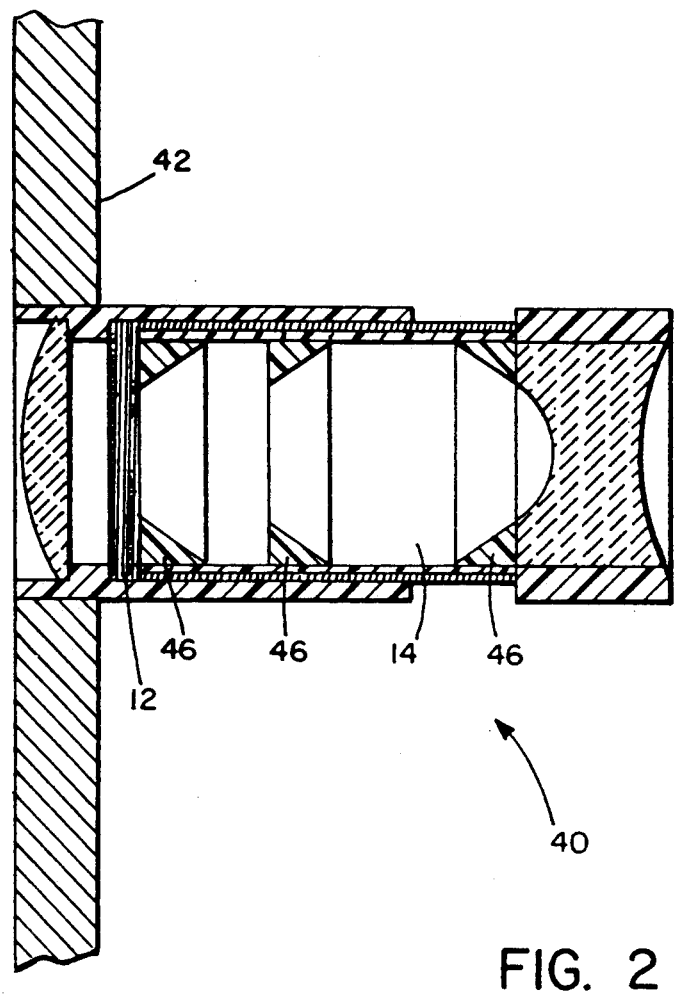
FIG. 2 is a side view of a telemicroscopic apparatus having a telemicroscope with light absorbing baffles mounted in a spectacle lens.

One embodiment of the present invention which is of particular interest involves the mounting of a telemicroscope with baffles on a carrier such as spectacle frames. FIG. 2 shows a side view of a telemicroscope 40 mounted in the lens 42 of a pair of spectacles. Two baffles 46 are spaced apart in the tube of the telemicroscope. The baffles will block and absorb light along the sides of the inside of the tube and reduce the glare reaching the eye of the wearer.

In an important application of the telemicroscope, simultaneous viewing of both magnified and non-magnified images is obtained. As discussed in U.S. Pat. No. 4,540,238 to Edwards and U.S. patent application Ser. No. 07/134,794 to Edwards et al., this requires proper positioning of a telemicroscope mounted on a carrier such as the spectacle frames of FIG. 2. Although FIG. 2 depicts the telemicroscope 46 as having its central axis relatively perpendicular to the surface of lens 42, for simultaneous bilevel viewing the central axis of the telemicroscope should be angled relative to the proper central line of sight through the carrier. Edwards et al. show that the best results are achieved when the end of the telemicroscope closest to the eye is displaced further from the central line of sight than the opposite end. To be used in simultaneous viewing the outer diameter of the tubes 12 and 14 must be no greater than about 10.3 mm.

While the invention has been shown and described with reference to preferred embodiments thereof, it will be understood by those skilled in the art that various changes in form and details may be made therein without departing from the spirit and scope of the invention as defined by the appended claims. In particular, baffles may be used in a number of telemicroscopes of different shapes and sizes to reduce the glare and optical noise reaching the output. The number of baffles used is also not crucial, with the optimum number and the appropriate dimensions being dependent on the application, and particularly the length and internal diameter of the telemicroscope. One to seven baffles have been used. For example, a single baffle scope is used for a night vision application, where the scope has one baffle positioned directly in the center of the main tube. Because the scope is susceptible to a different kind of glare than the ordinary scope, additional baffles are not necessary.

The use of a telemicroscope with baffles also applies to sights on a rifle. The telemicroscope can be attached to a mounting bracket and mounted on a rifle such as the Colt Industries M-16 and AR-15 arms. The reduced glare in the rifle scope makes it easier to properly aim the weapon.

I claim:
1. A telemicroscope comprising:
   a tubular barrel having an inner diameter of less than about 16.0 millimeters;
   a front lens and a rear lens fitted to the tubular barrel;
   an aperture stop and a field stop between the front lens and rear lens; and
   at least one light absorbing annular baffle fitting within the circumference of the tubular barrel and being positioned between the aperture stop and the field stop, the baffle having an outer diameter substantially equal to the inner diameter of the tubular barrel, and having an inner surface which tapers to an inner edge.

2. The telemicroscope of claim 1 wherein the surfaces of the baffle are given a dull finish to enhance the light absorbing properties of the baffle.

3. The telemicroscope of claim 1 wherein the baffle is sharpened to a knife edge along its smallest inner diameter at the intersection between a radial surface and a conical surface, the conical surface facing the rear lens.

4. The telemicroscope of claim 1 wherein the outer diameter of the baffle is about 12.7 mm. or less.

5. The telemicroscope of claim 4 wherein the inner diameter of the baffle is greater than about 1.0 mm.

6. The telemicroscope of claim 1 wherein the difference between the inner diameter and the outer diameter of the baffle is between about 1.0 mm and 4.0 mm.

7. The telemicroscope of claim 1 wherein the baffle is positioned next to a lens and prevents light from passing through a peripheral portion of a surface of the lens.

8. The telemicroscope of claim 1 wherein the barrel is formed of at least two portions coupled by screw threads, the two portions being adapted to be rotated relative to each other for focusing of the telemicroscope.

9. The telemicroscope of claim 1 comprising a plurality of the baffles.

10. A telemicroscopic apparatus comprising a telemicroscope mounted to a carrier for positioning in front of a person's eye, the telemicroscope having a tubular barrel with a front lens and rear lens fitting within the circumference of the barrel and a light absorbing annular baffle fitting within the circumference of the barrel and being positioned between the front lens and the rear lens, the baffle having an outer diameter substantially equal to the inner diameter of the tubular barrel, and having an inner surface which tapers to an inner edge.

11. The telemicroscopic apparatus of claim 10 wherein the carrier comprises a transparent plate.

12. The telemicroscopic apparatus of claim 11 wherein the transparent plate is a spectacle lens.

13. The telemicroscopic apparatus of claim 10 wherein the surfaces of the baffle are given a dull finish to enhance the light absorbing properties of the baffle.

14. The telemicroscopic apparatus of claim 10 wherein the baffle is sharpened to a knife edge along its smallest inner diameter.

15. The telemicroscopic apparatus of claim 10 wherein the outer diameter of the baffle is less than about 16.0 mm.

16. The telemicroscopic apparatus of claim 10 wherein the inner diameter of the baffle is greater than about 1.0 mm.

17. The telemicroscopic apparatus of claim 10 wherein the difference between the inner diameter and the outer diameter of the baffle is greater than 1.0 mm.

18. The telemicroscopic apparatus of claim 10 wherein the baffle is positioned next to a lens and prevents light from passing through a portion of a lens surface.

19. The telemicroscopic apparatus of claim 10 wherein the largest inner diameter of the baffle is substantially equal to the outer diameter of the baffle.

20. A telemicroscope comprising:
a tubular barrel;
a front lens and a rear lens fitting within the circumference of the barrel;
a plurality of light absorbing annular baffles fitting within the circumference of the barrel and being positioned between the front lens and the rear lens, each baffle having an outer diameter substantially equal to the inner diameter of the barrel and having an inner surface which tapers to an inner edge sharpened to a knife edge, the surfaces of each baffle having a dull finish to enhance the light absorbing properties of the baffle; and
a carrier to which the telemicroscope is mounted for positioning the telemicroscope in front of a person's eye, the telemicroscope being mounted such that the person is able to view and perceive a principal image of an object and a clear magnified image of the object simultaneously, the telemicroscope being mounted to the carrier at an angle such that the telemicroscope's central axis is angled relative to the proper central line of sight through the carrier, the end of the telemicroscope closest to the eye being displaced further from the central line of sight.

* * * * *